3,194,678
POLYMERS CROSS-LINKED WITH SULFUR DI-
OXIDE, FABRICS COATED THEREWITH, AND
COATING METHOD
John R. Caldwell, Kingsport, Tenn., assignor to Eastman
Kodak Company, Rochester, N.Y., a corporation of
New Jersey
No Drawing. Filed Dec. 20, 1960, Ser. No. 76,994
20 Claims. (Cl. 117—62.1)

This invention relates to the preparation of novel cross-linked condensation polymers. More particularly, this invention concerns the preparation of three-dimensional, cross-linked, insoluble polymers.

Prior art condensation polymers containing olefinic linkages, for example, polyesters, polyamides, polyester amides, polyureas, polyurethanes, polysulfone-amides, and polyethers in many cases are incapable of making strong fibers and films and being resistant to temperatures above about 40 to 50° C. Many such polymers are relatively brittle and incapable of forming commercially satisfactory fibers and films.

After extended investigation I have found a process for the preparation of novel condensation polymers which exhibit surprisingly superior tensile strength, have a considerably higher softening point than the abovementioned condensation polymers known to the art, and are of improved elongation and toughness.

This invention has for one object to provide a novel cross-linked condensation polymer. Another object is to provide a method for producing novel cross-linked, insoluble polymers of high temperature stability and superior tensile strength and toughness. Other objects will appear hereinafter.

In the broader aspects of my invention, I have found that a polymer of outstanding tensile strength and ability to be formed into fibers and films may be obtained by treating a condensation polymer containing an olefinic linkage as represented by the structure

with sulfur dioxide in the presence of a suitable catalyst. The novel compositions produced by this process are useful as films, fibers, molded objects, and protective coatings, and may be fashioned into tubes, rods and other extruded shapes.

The cross-linked, substantially insoluble polymer of my invention is three-dimensional and is characterized by the following recurring linkage:

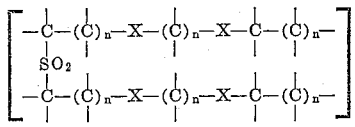

X is an ester group, amide group, ether group, urethane group, urea group, or sulfone-amide group, and $n$ is a whole number from 1–10. Because all of its molecules are linked in a three-dimensional, insoluble structure, the cross-linked polymer does not have a molecular weight in the ordinary sense. However, the polymers from which it is prepared generally have a molecular weight ranging from about 3,000 to about 30,000. Cross-linked polymers prepared from straight-chain polymers having a molecular weight of from about 3,000 to about 10,000 are more suitable for protective coatings, whereas those prepared from polymers having a molecular weight higher than 10,000 are more adapted for use as fibers and films of maximum strength.

The polymers of this invention possess a highly affinity for dyes and are capable of absorbing moisture, highly desirable features for such compositions which can be readily spun into fibers, as will be illustrated in the examples to follow. They are substantially insoluble in most organic solvents used in spinning solutions.

In another embodiment of my invention, the condensation polymer containing olefinic linkages may be mixed with other polymeric materials prior to treatment with sulfur dioxide. Any of the abovementitoned unsaturated condensation polymers such as polyesters, polyamides, polyester amides, polyureas, polyurethanes, polysulfone-amides, polyethers, and the like may be reacted with sulfur dioxide in accordance with my invention. The olefinic linkage may be present in any component in the condensation polymer, e.g., in a glycol, a diamine, an amino acid, a dicarboxylic acid, a diisocyanate, a hydroxy acid, or the like. Preferred unsaturated compounds used in the preparation of the polymers which may be cross-linked with sulfur dioxide to produce the novel polymers of this invention are cyclohexene and bicycloheptene derivatives such as those represented by the following formulas:

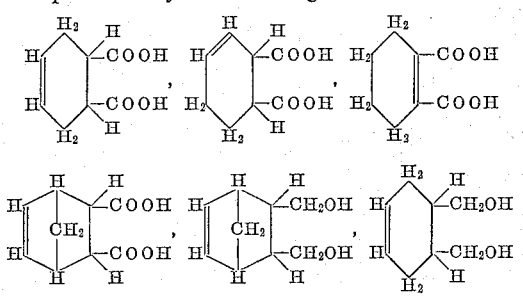

and

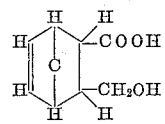

Typical unsaturated acids which may be reacted with constituents occurring in the condensation polymer linkages are itaconic, citraconic, maleic, fumaric, ethylidenemalonic, isobutylidenemalonic, and methyleneadipic. Unsaturated glycols occurring in such condensation polymers are 2-butene-1,3 diol, glycerine monoallyl ether, timethylolethane monoallyl ether, pentaerythritol dimethallyl ether and the like.

The condensation polymers should contain at least 2 mole percent and preferably at least 5 mole percent of the usaturated component. The cross-linking reaction for the production of the polymer may be represented by the following equation:

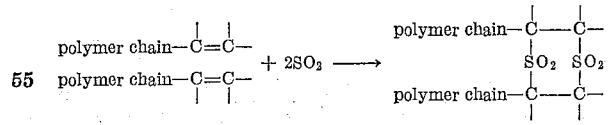

As can be seen by this equation, two polymer chains become linked together by sulfone groups. The polymer may thus be characterized as a cross-linked, insoluble compound polymer containing sulfone linkages between the molecular chains and resulting from treatment of a condensation polymer containing olefinic linkages with sulfur dioxide in the presence of an appropriate catalyst, such as an organic peroxy compound, an inorganic peroxide, or a salt such as lithium nitrate or silver nitrate.

Suitable organic peroxy compounds are benzoyl peroxide, acetyl peroxide, cumene, peroxide, tert-butyl hydroperoxide and the like. Inorganic peroxides which may be used include hydrogen peroxide, potassium persulfate, sodium perborate, and the like. It is also possible to catalyze the cross-linking with actinic light.

The condensation polymers of my invention contain from about 2 to about 33 mole percent and preferably from about 5 to about 15 mole percent of the originally unsaturated component. Thus, they are characterized by a limited amount of cross-linking, which is critical to the superior elongation and toughness. This elongation and toughness is particularly unexpected in view of the fact that it was heretofore thought that, in general, as the amount of cross-linking increases, the more brittle a polymer becomes.

This limiting amount of unsaturation in the condensation polymers used to prepare my insoluble, cross-linked polymers is directly related to the number of cross-linkages contained therein, since a sulfone cross-linkage occurs at substantially each point where an olefin double bond occurs in the starting polymer. In other words, polymers produced by cross-linking with sulfur dioxide in accordance with this invention are limited to 2 to 33 mole percent cross-linking and preferably 5 to 15 mole percent. Above the 5–15 range, toughness, elongation, and tensile strength drop off and the polymer tends to become brittle, while below this range the fibers and films formed therefrom tend to lose strength and become weak.

The unsaturated condensation polymer may be treated with sulfur dioxide in a variety of ways. In one method, a peroxide catalyst is incorporated in an unsaturated condensation polymer and the polymer is converted into the desired shape. The shaped product is then exposed to sulfur dioxide in gaseous form or as a solution in a suitable solvent. In another method, the unsaturated condensation polymer, in the form of sheets, fibers, and the like is suspended in an atmosphere of sulfur dioxide and irradiated with ultraviolet light. The cross-linking reaction may be combined with a spinning or extruding operation. Thus, for example, the unsaturated condensation polymer may be dissolved in a solvent along with the catalyst. The solution is then extruded into an atmosphere or liquid bath containing sulfur dioxide.

A further understanding of my invention will be had from a consideration of the following examples which are set forth to illustrate certain of my preferred embodiments.

*Example I*

A linear polyester was prepared from 3 moles of tetramethylene glycol, 2 moles of adipic acid, and 1 mole of bicyclo(2,2,1)hept - 5 - ene-2,3-dicarboxylic acid. Ten parts of the unsaturated polyester and 0.3 part of benzoyl peroxide were dissolved in 50 parts of methylene chloride. The solution was coated on a glass plate and the solvent was evaporated to produce a film. The film was suspended in an atmosphere of sulfur dioxide for 10 minutes. It was insoluble in methylene chloride.

Filaments were produced from a separate portion of the above solution by extrusion through a spinneret into an alcohol bath saturated with sulfur dioxide at −10° C. The polyester reacted with the sulfur dioxide in the bath to give filaments that were insoluble in methylene chloride.

Another portion of the solution described above was sprayed onto a polyethylene fabric, and the fabric was suspended in an atmosphere of sulfur dioxide for 10–15 minutes at 25° C. The polyester coating showed good adhesion to the fabric and the fabric did not shrink or change in any way during the curing process.

A polyethylene fabric was similarly coated with a prior-art, unsaturated, polyethylene terephthalate polyester and required a temperature of 100°–120° C. and a time 30–60 minutes for successful curing. Even then a shrinkage of 12–15% took place due to softening and disorientation of the fibers. The polyethylene fabric prepared as above containing the cured, cross-linked bicycloheptene compound polyester coating was coated with neoprene rubber. Excellent adhesion thereto of the neoprene rubber resulted, as compared to the untreated fabric from which a similar neoprene coating pulled away in several places.

*Example II*

A linear polyester having a molecular weight of 4000–6000 was prepared by heating one mole of phthalic anhydride with 0.7 mole of ethylene glycol and 0.3 mole of glycerine-α-allyl ether. The polyester (1 part) was dissolved in methylene chloride (4 parts), and benzoyl peroxide (0.05 part) was added. The solution was applied to a metal plate, and the solvent was evaporated. The plate was then exposed to an atmosphere of sulfur dioxide for 5 minutes. The coating was insoluble in methylene chloride and showed excellent adhesion to the metal.

*Example III*

An unsaturated polyurethane was prepared from 4 moles of 2,4-tolylenediisocyanate, 3 moles of diethylene glycol, and 1 mole of bicyclo(2,2,1)hept-5-ene-2,3-dimethanol. The latter glycol has the structure

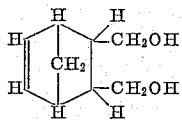

Ten parts of the polyurethane and 0.6 part acetyl peroxide were dissolved in 50 parts of ethyl alcohol. The solution was coated on paper, and the alcohol was evaporated at room temperature in a vacuum. The coated paper was then immersed in a saturated water solution of sulfur dioxide at 5° C. for 10 minutes. The polyurethane was cross-linked and became insoluble in alcohol.

*Example IV*

An unsaturated polyamide was made having the composition 5 moles azelaic acid, 1 mole 4-cyclohexene-1,2-dicarboxylic acid, and 6 moles 3,3′-ethylenedioxybispropylamine. Ten parts of the polyamide and 0.4 part benzoyl peroxide were dissolved in 60 parts ethyl alcohol, and the solution was coated on a nylon fabric. The solvent was evaporated and the fabric was immersed in a 5% solution of sulfur dioixde in acetone at 0° C. for 5 minutes. The coating became insoluble in alcohol.

*Example V*

A polyether was made by treating one mole of the sodium salt of $$(CH_3)_2C\left(\!\!\left\langle\!\!\bigcirc\!\!\right\rangle\!\!-OH\right)_2$$

with 0.8 mole of 1,4-dichlorobutane and 0.2 mole of 1,4-dichlorobutene. Ten parts of the polyether and 0.5 part benzoyl peroxide were dissolved in 40 parts methylene chloride. The solution was ocated on a glass plate and the solvent was evaporated. The film was immersed in a 2% solution of sulfur dioxide in alcohol at 0° for 15 minutes. It became insoluble in methylene chloride.

It is thought apparent from the foregoing that I have provided novel, substantially insoluble, cross-linked polymers of excellent dye affinity and moisture absorption suitable for use as film, fibers, shaped objects, and particularly as coating compounds for polyolefin fabrics.

Although the invention has been described in considerable detail with referenece to certain preferred embodiments thereof, it will be understood that variations and modifications can be effected within the spirit and scope of the invention as described hereinabove and as defined by the appended claims.

I claim:
1. A method for the preparation of a coated fabric which comprises adding a linear polyester prepared from tetramethylene glycol, adipic acid, and bicyclo(2,2,1)hept-5-ene-2,3-dicarboxylic acid in approximately a 3:2:1 molar ratio and a minor amount of a peroxy catalyst to a sufficient amount of methylene chloride to dissolve said linear polyester and said catalyst, spraying the resulting solution on a polyethylene fabric, and suspending said fabric containing said solution sprayed thereon in an atmosphere of sulfur dioxide for no longer than about 15 minutes, thereby curing same.

2. A method for the preparation of an improved textile fabric which comprises (A) forming a solution of (1) a volatile organic solvent, (2) a polymeric composition of matter essentially composed of polymeric linear chains which have an average molecular weight of at least 3,000, said linear chains consisting of monomeric units wherein from about 2% to about 33% of said units have an olefinic double bond, all of said monomeric units being derived from at least one bifunctional organic compound having its two functional substituents limited to those selected from the group consisting of carboxy, oxy, amino and isocyanato substituents and being linked end to end in linear chains by means of linkages selected from the group consisting of ester, amide and ether linkages, and (3) a minor amount of a peroxy catalyst, (B) incorporating said solution in a textile fabric, (C) evaporating said volatile solvent and (D) contacting said fabric with sulfur dioxide whereby said olefinic double bonds are sulfoxylated thereby interconnecting said linear chains with —$SO_2$— linkages.

3. A method as defined by claim 2 wherein said fabric is polyethylene.

4. A method as defined by claim 2 wherein said fabric is nylon.

5. A three-dimensional polymeric composition of matter essentially composed of polymeric linear chains which have an average molecular weight of at least 3,000, said linear chains consisting of monomeric units wherein from about 2% to about 33% of said units originally contained an olefinic double bond which has been sulfoxylated whereby —$SO_2$— linkages interconnect said linear chains, all of said monomeric units being derived from at least one bifunctional organic compound having its two functional substituents limited to those selected from the group consisting of carboxy, oxy, amino and isocyanato substituents and being linked end to end in linear chains by means of linkages selected from the group consisting of ester, amide and ether linkages.

6. A composition as defined by claim 5 wherein said monomeric units are derived from tetramethylene glycol, adipic acid, and bicyclo(2,2,1)hept-5-ene-2,3-dicarboxylic acid, said monomeric units being linked end to end by ester linkages and said sulfoxylated olefinic double bonds being present in from about 5 to about 15% of said monomeric units in said linear chains.

7. A composition as defined by claim 5 wherein said monomeric units are derived from phthalic anhydride, ethylene glycol, and glycerine-α-allyl ether, said monomeric units being linked end to end by ester linkages and said sulfoxylated olefinic double bonds being present in from about 5 to about 15% of said monomeric units in said linear chains.

8. A composition as defined by claim 5 wherein said monomeric units are derived from 2,4-tolylenediisocyanate, diethylene glycol and bicyclo(2,2,1)hept-5-ene-2,3-dimethanol, said monomeric units being linked end to end by urethane linkages and said sulfoxylated olefinic double bonds being present in from about 5 to about 15% of said monomeric units in said linear chains.

9. A composition as defined by claim 5 wherein said monomeric units are derived from azelaic acid, 4-cyclohexene-1,2-dicarboxylic acid and 3,3′-ethylene dioxybispropylamine, said monomeric units being linked end to end by amide linkages and said sulfoxylated olefinic double bonds being present in from about 5 to about 15% of said monomeric units in said linear chains.

10. A composition as defined by claim 5 wherein said monomeric units are derived from the sodium salt of a compound having the formula

1,4-dichlorobutane and 1,4-dichlorobutene, said monomeric units being linked end to end by ether linkages and said sulfoxylated olefinic double bonds being present in from about 5 to about 15% of said monomeric units in said linear chains.

11. A composition as defined by claim 5 wherein said sulfoxylated double bonds are present in from about 5 to about 15% of said monomeric units in said linear chains.

12. A composition as defined by claim 5 wherein said monomeric units having a sulfoxylated olefinic double bond are derived from a bicycloheptene compound.

13. A composition as defined by claim 12 wherein said bicycloheptene compound is bicyclo(2,2,1)hept-5-ene-2,3-dicarboxylic acid.

14. A composition as defined by claim 12 wherein said bicycloheptene compound is bicyclo(2,2,1)hept-5-ene-2,3-dimethanol.

15. A composition as defined by claim 5 wherein said monomeric units having a sulfoxylated olefinic double bond are derived from a cyclohexene compound.

16. A polyethylene fabric having incorporated therein a composition as defined by claim 5.

17. A polyethylene fabric having incorporated therein a composition as defined by claim 6.

18. A nylon fabric having incorporated therein a composition as defined by claim 9.

19. A fabric as defined by claim 16 having a neoprene coating adhering thereto.

20. A fabric as defined by claim 17 having a neoprene coating adhering thereto.

References Cited by the Examiner
UNITED STATES PATENTS

| | | | |
|---|---|---|---|
| 1,252,001 | 1/18 | Hadfield et al. | 117—62.1 X |
| 2,578,063 | 12/51 | Hackmann | 264—184 |
| 2,591,254 | 4/52 | Hackmann | 264—184 |
| 2,731,426 | 1/56 | Lane | 260—79.3 X |
| 2,770,603 | 11/56 | Lynch | 260—79.3 X |
| 2,899,412 | 8/59 | Caldwell et al. | 260—79.3 |
| 2,929,801 | 3/60 | Koller | 260—79.3 X |
| 3,000,762 | 9/61 | Teroso | 117—156 X |
| 3,030,249 | 4/62 | Schollenberger et al. | 117—161 X |
| 3,072,616 | 1/63 | Wright et al. | 260—79.3 X |
| 3,073,807 | 1/63 | Stuart et al. | 260—79.3 |

FOREIGN PATENTS

| | | |
|---|---|---|
| 152,589 | 7/53 | Australia. |
| 671,499 | 5/52 | Great Britain. |

WILLIAM D. MARTIN, *Primary Examiner.*

RICHARD D. NEVIUS, *Examiner.*